(12) United States Patent
Henneboehle et al.

(10) Patent No.: US 6,409,368 B1
(45) Date of Patent: Jun. 25, 2002

(54) LIGHTING DEVICE FOR VEHICLES

(75) Inventors: Klaus Henneboehle, Bueren-Steinhausen; Heinz-Albert Puettmann, Hamm, both of (DE)

(73) Assignee: Hella KG Hueck & Co., Lippstadt (DE)

( * ) Notice: Subject to any disclaimer, the term of this patent is extended or adjusted under 35 U.S.C. 154(b) by 0 days.

(21) Appl. No.: 09/676,510

(22) Filed: Oct. 2, 2000

(30) Foreign Application Priority Data

Sep. 30, 1999 (DE) .......................... 199 46 850

(51) Int. Cl.[7] .............. B60Q 1/26; F21V 7/04
(52) U.S. Cl. .............. 362/517; 362/297; 362/346; 362/510; 362/518
(58) Field of Search .............. 362/293, 297, 362/346, 510, 517, 518

(56) References Cited

U.S. PATENT DOCUMENTS

| | | | | |
|---|---|---|---|---|
| 1,412,470 A | * | 4/1922 | Kaufman | 362/517 |
| 4,383,290 A | * | 5/1983 | Binder et al. | 362/518 |
| 4,558,402 A | * | 12/1985 | Tysoe | 362/517 |
| 4,912,606 A | * | 3/1990 | Yamamoto | 362/517 |
| 5,070,432 A | * | 12/1991 | Kitazumi et al. | 362/518 |
| 6,019,492 A | * | 2/2000 | Ikegaya et al. | 362/517 |

FOREIGN PATENT DOCUMENTS

| | | |
|---|---|---|
| DE | DE 29 02 904 A1 | 8/1979 |
| DE | DE 90 01 659 U1 | 5/1990 |
| DE | D4 198 23 106 A1 | 12/1998 |
| DE | DE 198 07 409 A1 | 8/1999 |

* cited by examiner

*Primary Examiner*—Alan Cariaso
(74) *Attorney, Agent, or Firm*—Birch, Stewart, Kolasch & Birch

(57) ABSTRACT

The lighting device for a vehicle has a light fixture compartment whose interior is formed by a light housing and a transparent cover panel. A reflector is arranged in the interior and is formed by optical faces arranged on the side of the wall section facing the cover panel; on their outside these optical faces have a reflective layer. An area of the cover panel which is free of optical faces is provided for the reflector.

13 Claims, 5 Drawing Sheets

LIGHTING DEVICE FOR VEHICLES

BACKGROUND OF THE INVENTION

1. Field of the Invention

The present invention relates to lighting devices for vehicles and more particularly, lighting devices having at least one light housing with a light compartment, a transparent cover panel and a reflector arranged in the interior of the lighting device, and a plurality of optical surfaces on one side, where the cover panel has at least one smooth area which is free of optical surfaces for the reflector.

2. Related Art

Such a lighting device for vehicles is known from German Patent 198 23 106 A1. A light fixture having multiple light fixture compartments is used as the lighting device. The light fixture compartments are formed by a common light housing made of plastic and a cover panel that covers the light housing. The rear side of the light housing is formed by shell-shaped reflectors, each having one lamp. The cover panel consists of multiple integrally molded light panel sections in different colors. One light compartment has a red colored light panel section on which is mounted a sealing plate via ultrasonic welding. The reflector is formed by an intermediate panel that is supported by the sealing plate on the side facing the cover panel. On the side facing away from the cover panel, the intermediate panel has retro-reflective optical faces which are formed by triple prisms or cuboid corners, which totally reflect beams of light that pass through the cover panel from the outside and enter the intermediate panel. A section of the cover panel running adjacent to the intermediate panel has a smooth surface on the inside and outside. It is a disadvantage here that the reflector itself and the sealing plate are additional parts and require a separate a method, such as ultrasonic welding, for attaching the sealing plate to the cover panel.

In addition, a reflex reflector mounted on the cover panel in this manner may be undersirable for optical reasons, because the tie-down points of the sealing plate supporting the reflector are clearly visible from the outside.

SUMMARY OF THE INVENTION

The object of the invention is to provide a light fixture for motor vehicles in which no transparent intermediate panel arranged in an interior of the light fixture is necessary for a reflector, and nevertheless the reflex reflector can be arranged at a distance from the cover panel.

This object is achieved according to the present invention by the fact that the reflector, having the side occupied with the optical surfaces, is facing the cover panel, and on this side it has a reflective layer applied to the optical faces, so that after being reflected several times on this reflective layer, beams of light are reflected back in their incident direction. These optical surfaces provided with a reflective layer are similar to known reflectors, where the beams of light penetrate the reflector, and there is total reflection of the beams of light on the optical surfaces. The optical elements having the optical faces may be in the form of a triple prism or a cuboid corner, as with known reflectors. The reflector may be in the form of a planar surface that can be aligned accurately, so a high optical efficiency can be achieved. The principle of the reflector is based on direct reflection of beams of light, which pass through the cover panel from the outside, on the reflective layer of optical surfaces. With known reflectors whose optical surfaces are arranged on the backside of a transparent intermediate panel, there is degradation of the light because the beams of light are reflected by total reflection only after entering the intermediate panel.

The reflector may be made of a transparent material or an opaque material. Thus, the wall section having the reflector may be designed in one piece with the reflector or the cover shield. Therefore, it is advantageous if the reflective layer of the optical surfaces develops into a reflective layer of the reflector or a mirrored surface of the cover shield. This eliminates the need for application of an additional reflective layer to the optical surfaces of the reflector. The reflector may also be formed by a wall section of the light housing.

The wall section forming the reflector also functions as a cover shield when it runs next to the effective reflective surface of the reflector and is integrally molded on the front edge section of the reflector and extends to a front edge section of the light housing. Therefore, the edge adjacent to the effective reflective surface may be shaped as desired.

In the case of a reflector that marks the side of the vehicle, it is advantageous if it is integrated into a flashing light fixture and is arranged on a surface of a lateral wall section of the flashing light pointing toward the side of the vehicle. The reflective layer of the optical surfaces of the reflector and the reflective surface of the reflector can be applied together to a reflector if the lateral wall section is integrally molded in one piece on the reflector. The cover panel of the flashing light or an intermediate panel arranged in the interior of the flashing light may be colored yellow.

The lighting device may be formed by a headlight, a front flashing light, a rear light or a reflex reflector marking the side of the vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
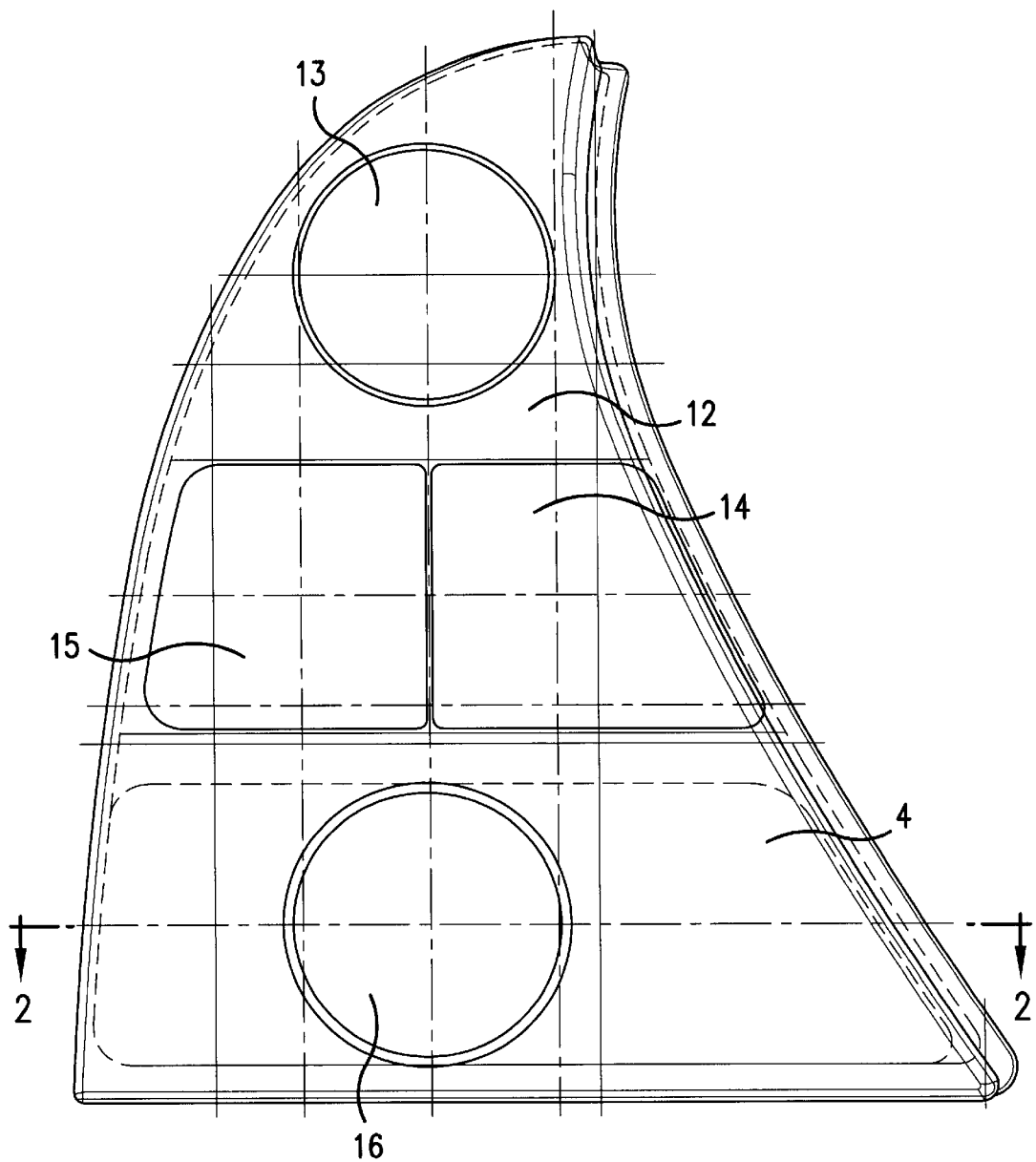
FIG. 1 illustrates a front view of a rear light for a vehicle having multiple light fixture compartments according to the present invention.
Figure 2:
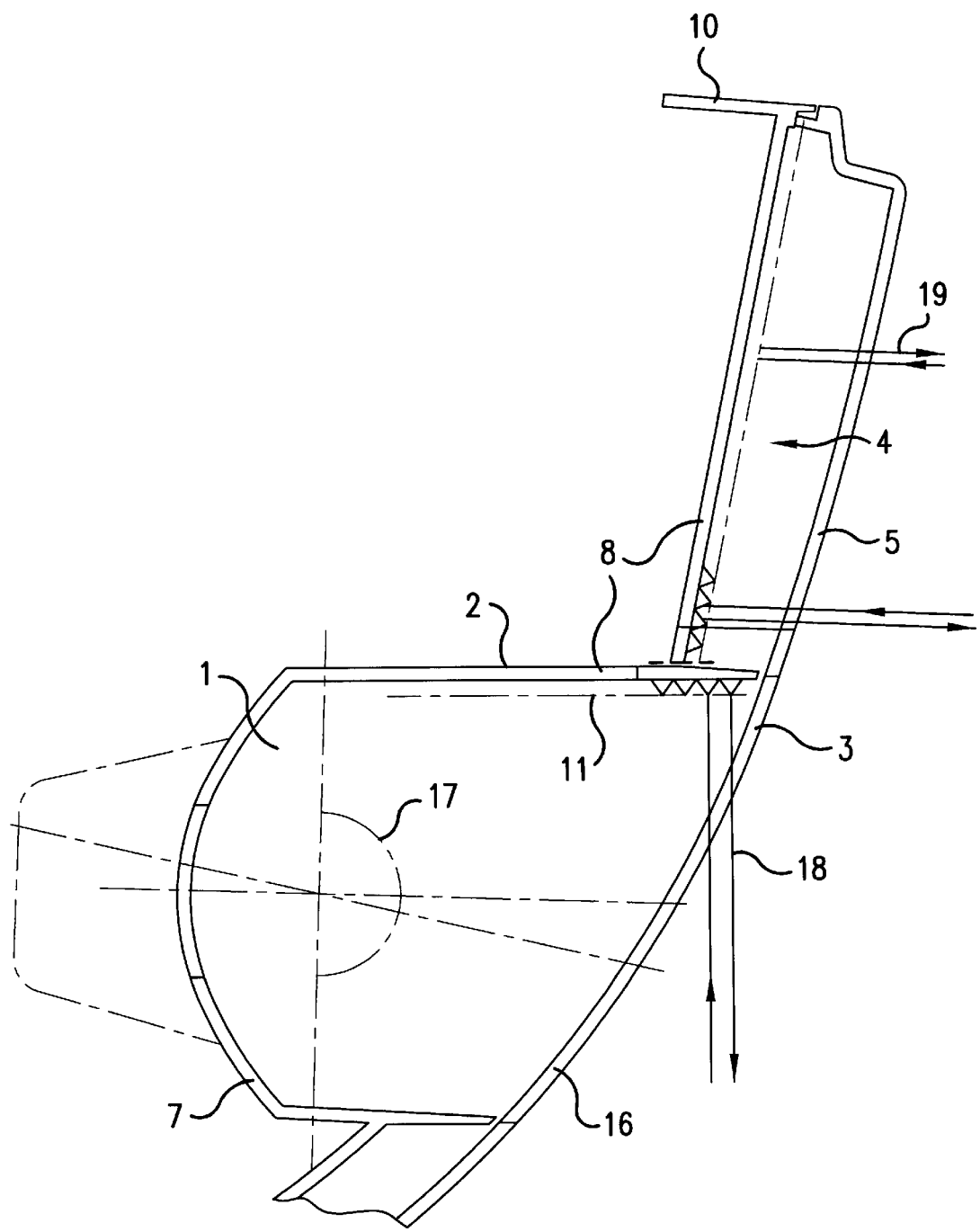
FIG. 2 is a cross-sectional view taken along line A—A of the rear light illustrated in FIG. 1, with a red reflector and a yellow reflector.

FIGS. 1 and 2 show a rear light for vehicles, which has multiple light fixture compartments 1. Light fixture compartments 1 are formed by a common light housing 2 and a common cover panel 3. The light housing 2 and the cover panel 3 are made of molded plastic. Cover panel 3 has a red frame-like base body 12 which has light panel sections 13, 14, 15 and 16 for a brake light, a tail light, a back-up light and a flashing light, respectively, molded in its windows. Light panel section 16 is colored yellow and is designed without optical surfaces. Likewise, an area 5 of the frame-like base body 12 which surrounds the yellow light panel section 16 is also designed without optical surfaces. The light housing 2 has a shell-shaped reflector 7, which is provided for the yellow light panel section 16 and is formed by the backside of the light housing 2. An opening is provided in the crown area of reflector 7 to accommodate a lamp 17. Adjacent to the shell-shaped reflector 7, the rear side of the light housing 2 has flattened wall sections 8 with reflector 7 arranged between them. The wall sections 8 run vertically and in the longitudinal direction of the vehicle. One of the two wall sections is designed longer and its inside surface 11 facing the light fixture compartment 1 is provided with optical surfaces 6 which face the light panel section running obliquely and have a mirrored reflective layer on the outside. This reflective layer develops into the mirrored reflective layer of the shell-shaped reflector 7. With its optical surfaces 6, the wall section 8 bordering the light fixture compartment 1 points toward the side of the vehicle when the light fixture is mounted on the vehicle. Beams of light 18 striking laterally from the outside and passing through the yellow light panel section 16 are deflected 180° by reflection on the reflective layer of optical faces 6. Thus, together with the yellow light panel section 16, the optical faces 6 provided with the reflective layer function as a lateral reflex reflector bordering the side of the vehicle. Adjacent to the light fixture compartment 1, the light housing 2 has a planar wall section 8 which is formed by the rear side of the light housing 2 and runs vertically and across the longitudinal axis of the vehicle. This wall section 8 is provided for the red colored area 5 of the cover panel 3 and also has optical surfaces 6 with an outer reflective layer on the side facing area 5. The beams of light 19 passing through the red area 5 from the outside are deflected by 180° by reflection on these optical faces 6. On the side facing the cover panel 3, the reflector 7 and the two planar wall sections 8, which are provided with optical faces 6 have a cohesive reflective layer.

Figure 3:
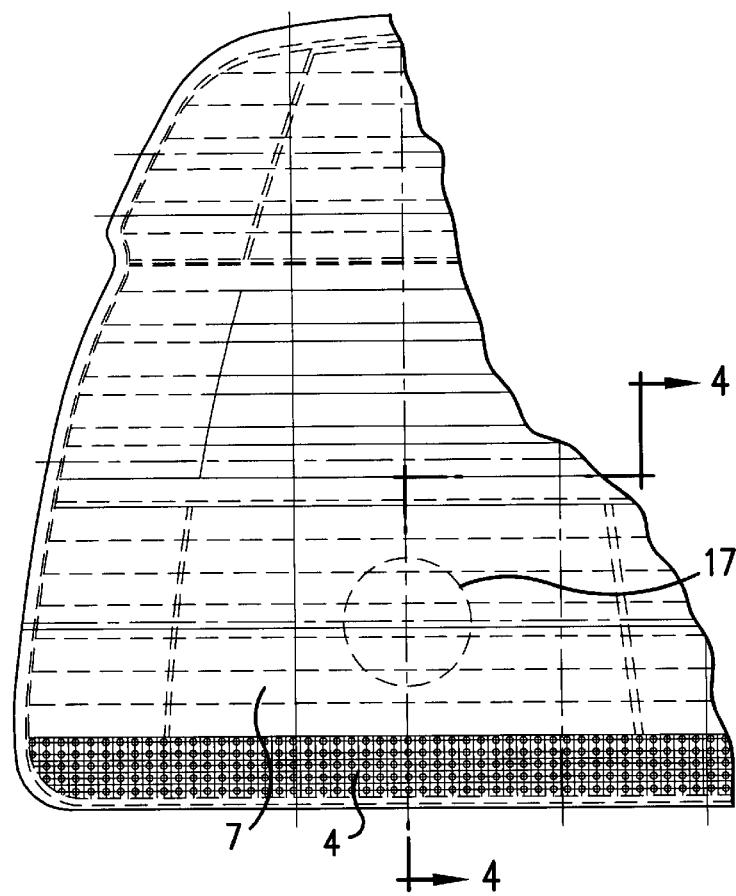
FIG. 3 illustrates a front view of another rear light for a motor vehicle according to the present invention.
Figure 4:
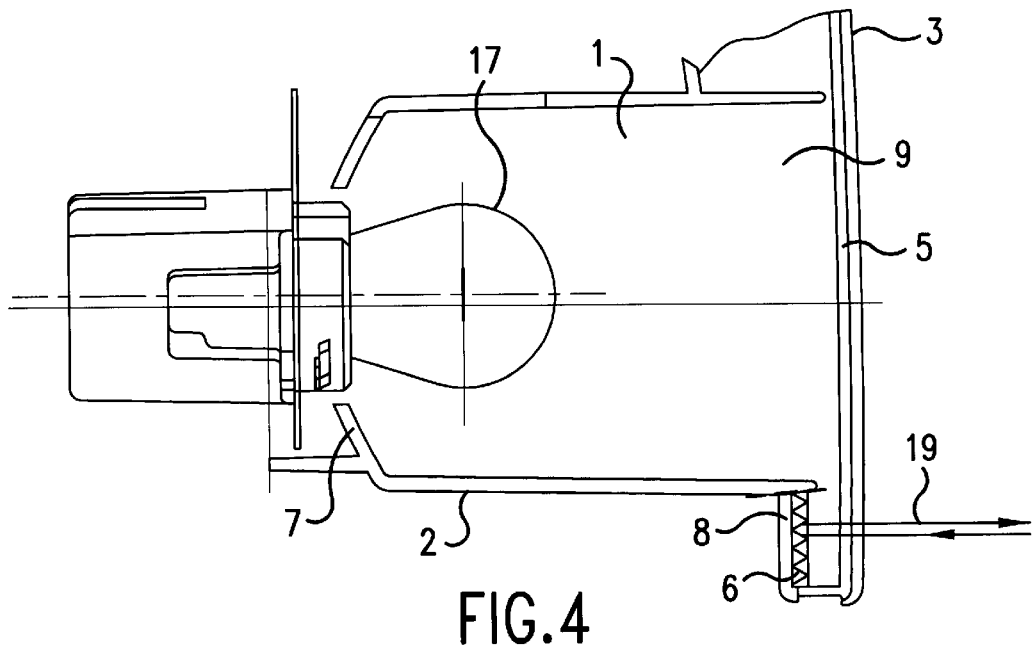
FIG. 4 is a cross-sectional view taken along line B—B illustrated in FIG. 3.

In the case of the rear light fixture illustrated in FIGS. 3 and 4, the lamp 17 for the brake light arranged in the light fixture compartment 1 and the area 5 of the cover panel 3 provided for the light fixture compartment 1 are colored red. The red area 5 extends to below the light fixture compartment 1 and covers a planar wall section 8 which is integrally molded on the front edge section of the reflector 7 and which is covered on the side facing the red area with optical surfaces, 6 which have a cohesive mirrored layer together with the reflector 7.

Figure 5:
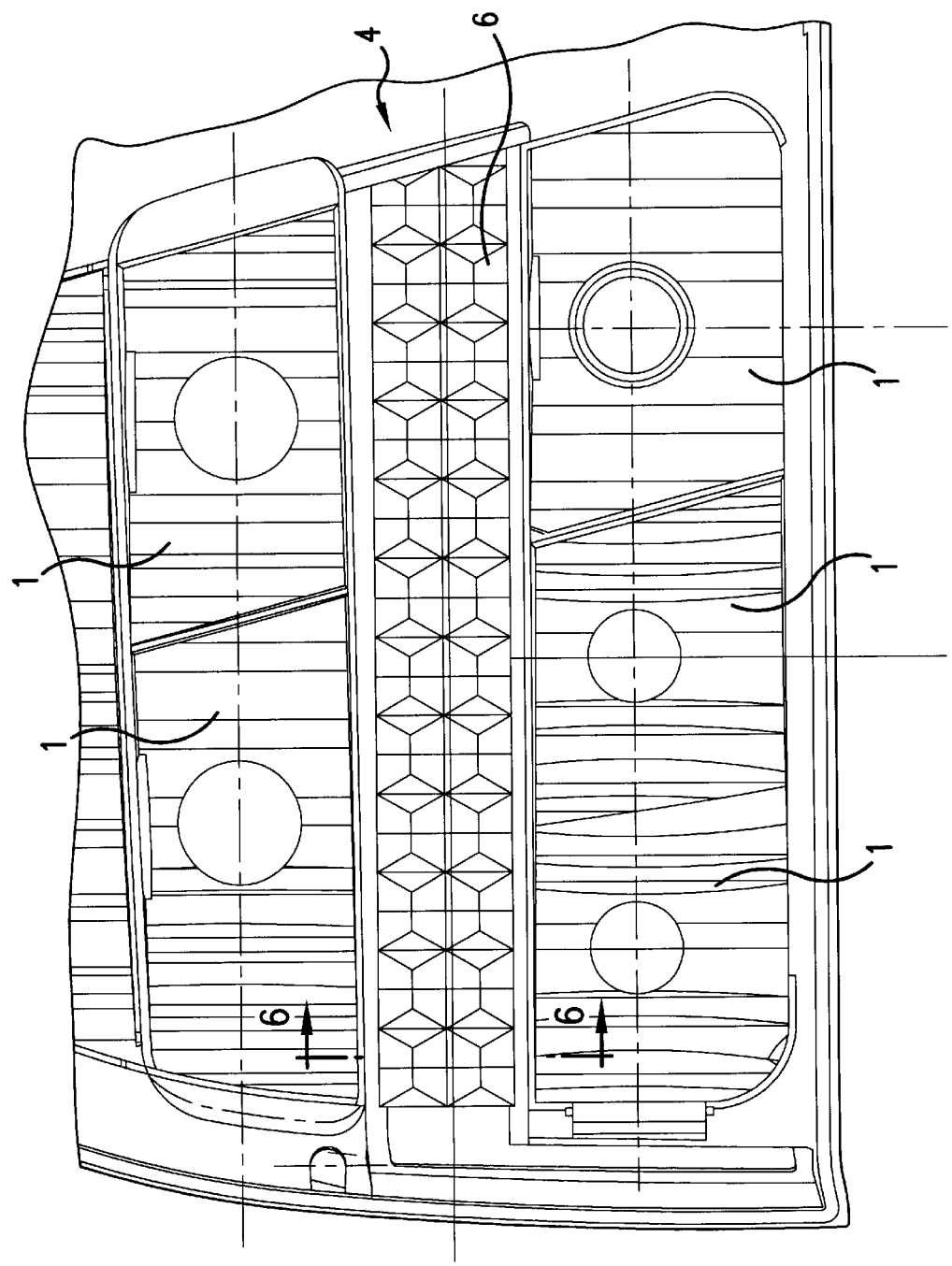
FIG. 5 illustrates a front view of another rear light for a motor vehicle according to the present invention.
Figure 6:
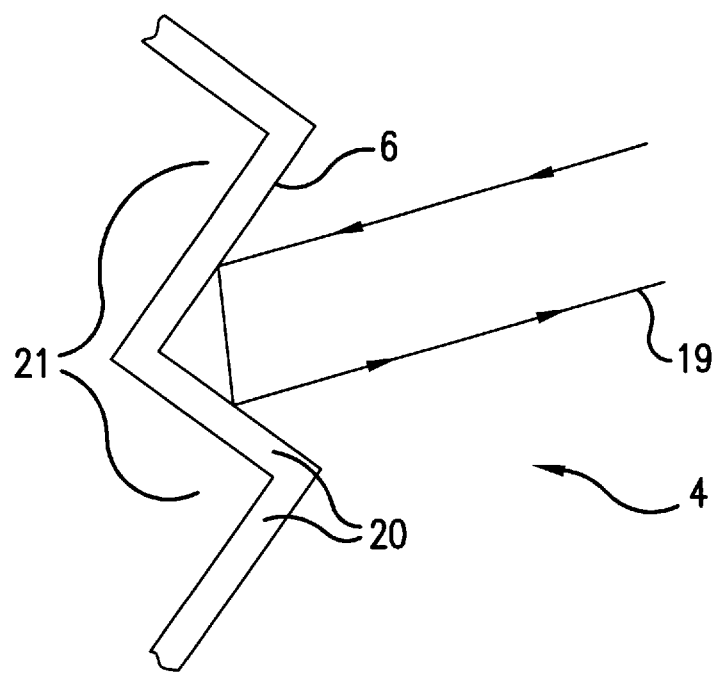
FIG. 6 is a cross-sectional view taken along line C—C illustrated in FIG. 5.
Figure 7:
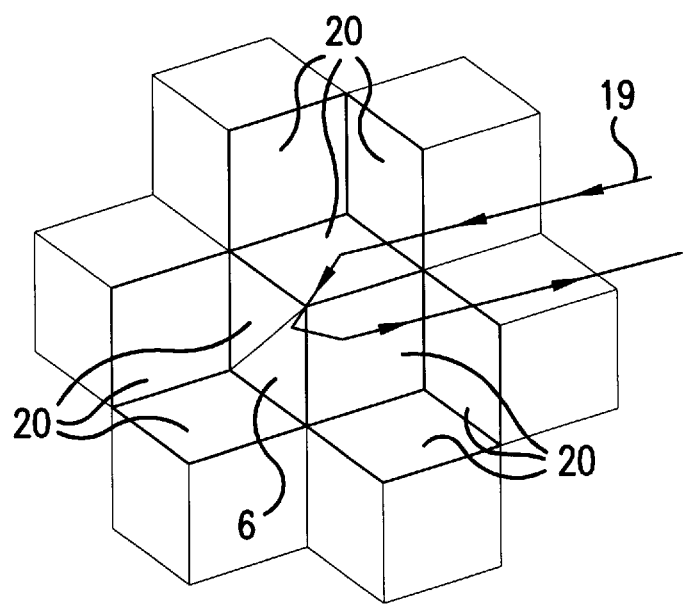
FIG. 7 illustrates a front view of a part of the reflector shown in FIGS. 5 and 6.

In the case of the rear light illustrated in FIGS. 5–7, a wall section 8 having optical surfaces 6 of a reflector 4 is arranged between reflectors 7. The wall section 8 may be made of a material which is different than a part supporting it. The optical surfaces 6 are formed by cuboid corners 20 and have a reflective layer. The wall section 8 and the reflectors 7 are formed by the rear side of a light housing 2. The cuboid corners 20 have a rectangular projected area perpendicular to the main face of the reflex reflector 4 with outside dimensions of 8 mm and 14 mm, preferably being 6 mm high and 6 mm wide. The optical elements formed by the cuboid corners 20 are arranged in lines. In the case of the rear light, only two side-by-side lines are necessary because of the very large optical elements. In addition, the reflex reflector appears brilliant from many directions because of the large optical elements. In order for the large cuboid corners 20 not to have any indentations on their optical surfaces 6 because of an accumulation of material, they are provided with a hollow space 21 on their rear side. Due to the hollow space 21, the cuboid corners 20 have a uniform wall thickness on their sides.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A lighting device for a vehicle comprising:
a light housing (2) with a transparent cover panel (3) and having a reflection element arranged in the interior of the device and provided with a plurality of optical surfaces (6) on a side facing the transparent cover panel, and on this side it has a reflective layer applied to the optical surfaces, where the cover panel (3) has at least one non-optic smooth area (5), wherein said reflection element facing the cover panel (3) with the side having the optical surfaces (6) is a rear reflector on which beams of light (18, 19) are reflected back into their incident direction after being reflected multiple times on three adjacent surfaces of said optical surfaces, wherein said optical surfaces are arranged orthogonal to one another.

2. The lighting device according to claim 1, wherein at least the smooth area (5) of the cover panel (3) for which the rear reflector (4) is provided has a pigmentation which determines the color of the rear reflector (4).

3. The lighting device according to claim 1, wherein the optical surfaces (6) are formed by a wall section (8) designed in one piece with the reflector (7), and the reflector (7) and the wall section (8) are made of an opaque material and have a cohesive reflective layer.

4. The lighting device according to claim 3, wherein the wall section (8) comprising the optical surfaces (6) is adjacent to the effective reflective surface of the reflector (7).

5. The lighting device according to claim 4, wherein the wall section (8) which is provided with the optical surfaces (6) surrounds the reflector (7) at least in some sections and extends to a front edge section (10) of the light housing (2).

6. The lighting device according to claim 3, wherein a surface (11) of the wall section (8) is provided with the optical surfaces (6), said surface positioned in a perpendicular fashion to said cover panel.

7. A lighting device according to claim 3, wherein a portion of the reflector (7) and the wall section (8) form the rear side of the light housing (2).

8. The lighting device according to claim 1, wherein the wall section (8) is made of a different material than a part supporting it.

9. The lighting device according to claim 1, wherein the light housing (2) has the optical surfaces (6) on one wall section (8).

10. The lighting device according to claim 1, wherein two adjacent optical surfaces (6) form a hollow space on inverse sides thereof.

11. The lighting device according to claim 10, wherein the optical surfaces (6) are at least 6 mm high and 6 mm wide when the device is installed.

12. The lighting device according to claim 10, wherein the a thickness of said optical surface remains unchanged.

13. A lighting device for a vehicle comprising:

a light housing;

a transparent cover enclosing said light housing, said transparent cover having at least one non-optic smooth surface;

a rear reflector having a first side, wherein said rear reflector is arranged within said light housing and said transparent cover;

a plurality of optical elements forming an optical surface, said optical surface arranged on said rear reflector, wherein said optical elements are positioned orthogonal to one another; and a reflective layer applied to said optical surface, said optical surface reflecting light in a incident direction.

* * * * *